(12) United States Patent
Leppanen et al.

(10) Patent No.: US 7,143,734 B1
(45) Date of Patent: Dec. 5, 2006

(54) COMPENSATOR ASSEMBLY FOR A MOTORCYCLE ENGINE

(75) Inventors: Robert L. Leppanen, Wauwatosa, WI (US); Dereck Schlett, Campbellsport, WI (US); Michael Duley, Slinger, WI (US); Richard M. Runte, Sussex, WI (US); Jalal M. Albulushi, Jackson, WI (US); Richard G. Dykowski, Waukesha, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 11/174,444

(22) Filed: Jul. 1, 2005

(51) Int. Cl.
*F02B 75/06* (2006.01)
*F16D 7/04* (2006.01)
(52) U.S. Cl. ...................... 123/192.1; 464/39
(58) Field of Classification Search ............. 123/192.1; 74/604; 464/37–39
See application file for complete search history.

(56) References Cited

U.S. PATENT DOCUMENTS 6,688,986 B1 * 2/2004 Hojyo et al. .................. 464/39

* cited by examiner

*Primary Examiner*—Noah P. Kamen
(74) *Attorney, Agent, or Firm*—Michael Best & Friedrich LLP

(57) ABSTRACT

A compensator assembly for a motorcycle engine including a hub and a compensator coupled to the engine crankshaft. The compensator is axially moveable along the crankshaft axis and a sprocket is supported for rotation with respect to the crankshaft. Cam surfaces on the compensator and the sprocket cooperate to transfer engine torque from the crankshaft to the sprocket. A spring biases the compensator into engagement with the sprocket and a resilient member is positioned between the hub and the compensator to resiliently limit axial movement of the compensator toward the hub. Torque pulses from the engine are damped by allowing relative rotation between the sprocket and the crankshaft.

26 Claims, 3 Drawing Sheets

COMPENSATOR ASSEMBLY FOR A MOTORCYCLE ENGINE

BACKGROUND

The present invention relates to a compensator assembly for a motorcycle engine. During individual engine combustion events, torque pulses are transmitted from the engine piston through the connecting rod and into the engine crankshaft. To reduce the transmission of these torque pulses from the crankshaft, through the primary drive, and into the transmission, a compensator assembly is positioned between the crankshaft and the primary drive sprocket that operates to reduce or dampen the torque pulses. Reduction of these pulses in this manner reduces wear on the other engine and transmission components and also enhances motorcycle drivability by providing a smoother transfer of power to the rear wheel.

SUMMARY

The invention provides an internal combustion engine including a crankcase assembly and a crankshaft supported for rotation about a crankshaft axis by the crankcase. A hub and a compensator are coupled to the crankshaft for rotation therewith. The compensator is axially moveable along the crankshaft axis and a sprocket is supported for rotation about the crankshaft axis, but is rotatable with respect to the crankshaft. A Belleville spring biases the compensator into engagement with the sprocket and a resilient member is positioned between the hub and the compensator. In response to relative rotation between the compensator and the sprocket resulting from engine torque pulses, cam surfaces defined on the sprocket and on the compensator cooperate to move the compensator axially against the biasing force of the Belleville spring. Sufficient axial movement of the compensator engages the compensator with the resilient member which compresses the resilient member between the compensator and the hub. The resilient member resiliently limits the axial movement of the compensator to prevent bottoming out of the Belleville spring and to prevent direct, rigid contact between the compensator and the hub.

In another aspect, the present invention provides an internal combustion engine that includes a crankcase assembly and a crankshaft supported for rotation about a crankshaft axis by the crankcase assembly. A hub is coupled to the crankshaft for rotation about the crankshaft axis. The hub defines a first surface that faces the crankcase assembly and a second surface that faces away from the crankcase assembly. A compensator defines a compensator surface that faces the second surface and a first cam surface that faces away from the crankcase assembly. The compensator is coupled for rotation with the crankshaft about the crankshaft axis and is also axially moveable along the crankshaft axis. A sprocket defines a second cam surface that faces the crankcase assembly, and is supported for rotation about the crankshaft axis. Unlike the compensator however, the sprocket is rotatable with respect to the crankshaft. The sprocket defines a second cam surface that faces the crankcase assembly. A Belleville spring biases the compensator away from the crankcase assembly and biases the first cam surface into engagement with the second cam surface. To dampen torque pulses during engine operation the compensator is axially moveable toward the crankcase assembly against the biasing force of the Belleville spring. Axial movement of the compensator in this manner affords relative rotation between the sprocket and the compensator which dampens the engine torque pulses.

Other aspects of the invention will become apparent by consideration of the detailed description and accompanying drawings.

Figure 1:
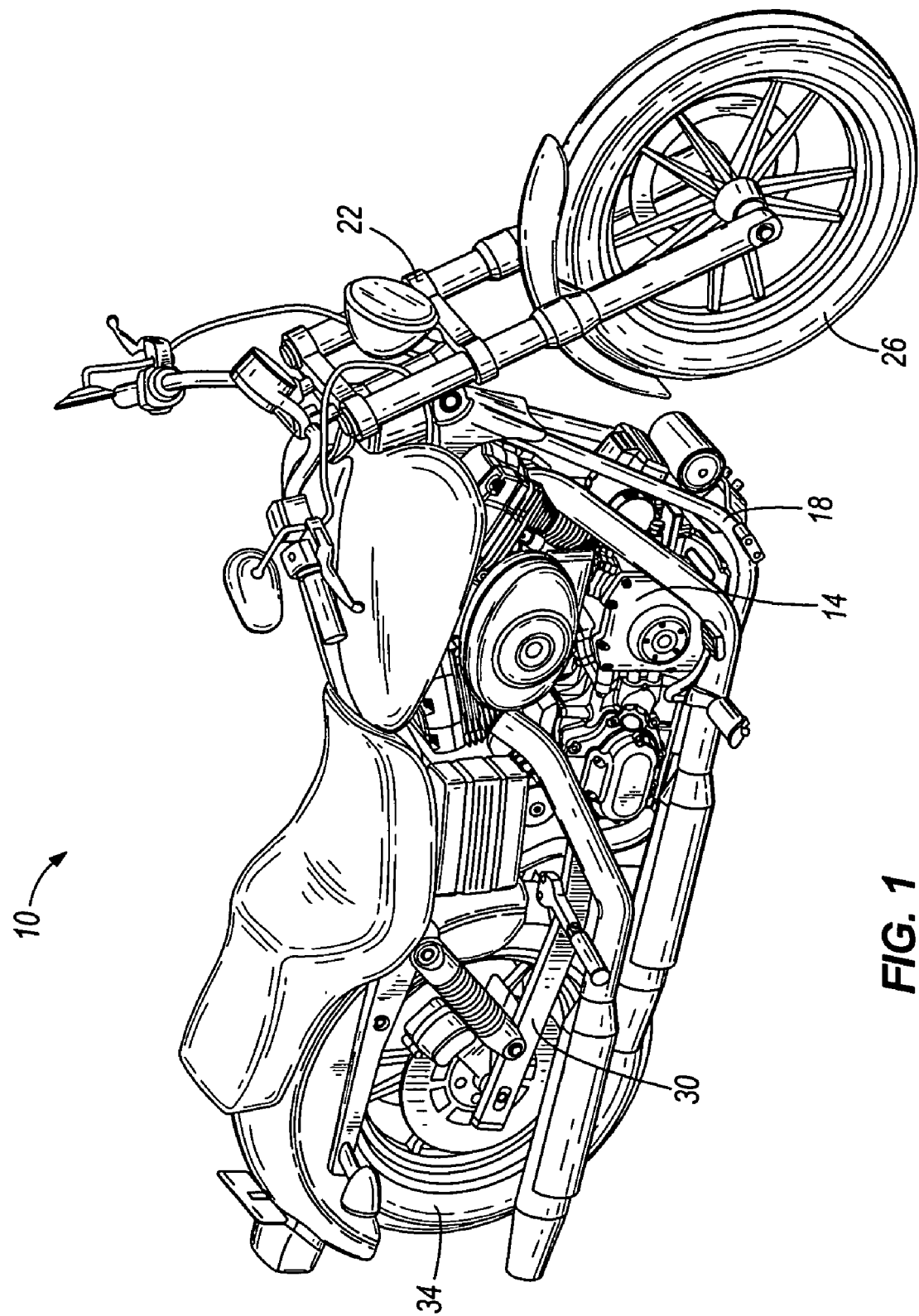
FIG. 1 is a perspective view of a motorcycle including an internal combustion engine embodying the invention.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a motorcycle 10 including an internal combustion engine assembly 14 embodying the invention. The motorcycle 10 includes a frame 18, a steering assembly 22 pivotally coupled to a forward portion of the frame 18, and a front wheel 26 rotatably coupled to the steering assembly 22. A swingarm 30 is pivotally coupled to a rearward portion of the frame 18 and a rear wheel 34 is rotatably coupled to the swingarm 30.

Figure 2:
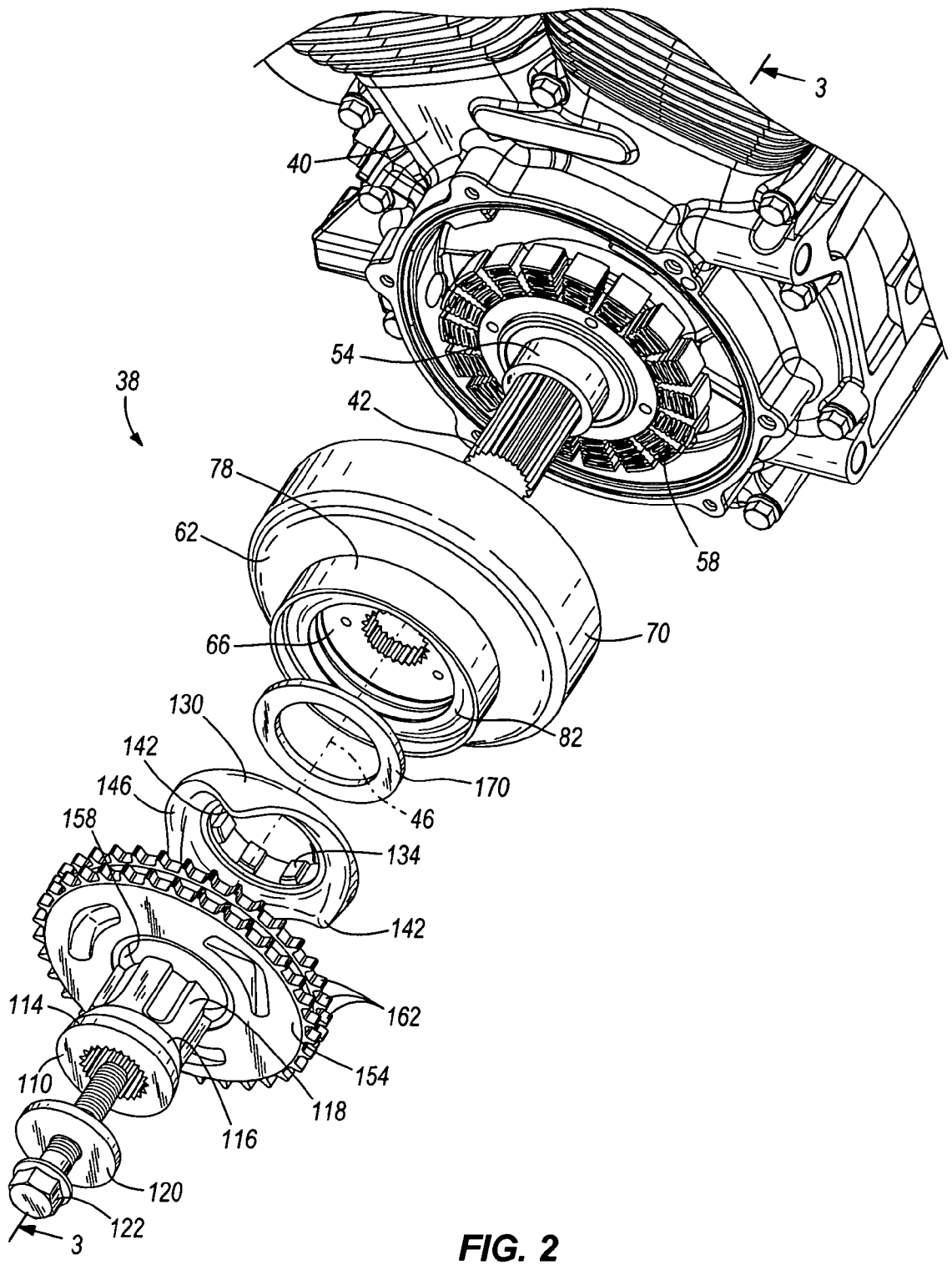
FIG. 2 is an exploded perspective view of a portion of the engine illustrated in FIG. 1.
Figure 3:
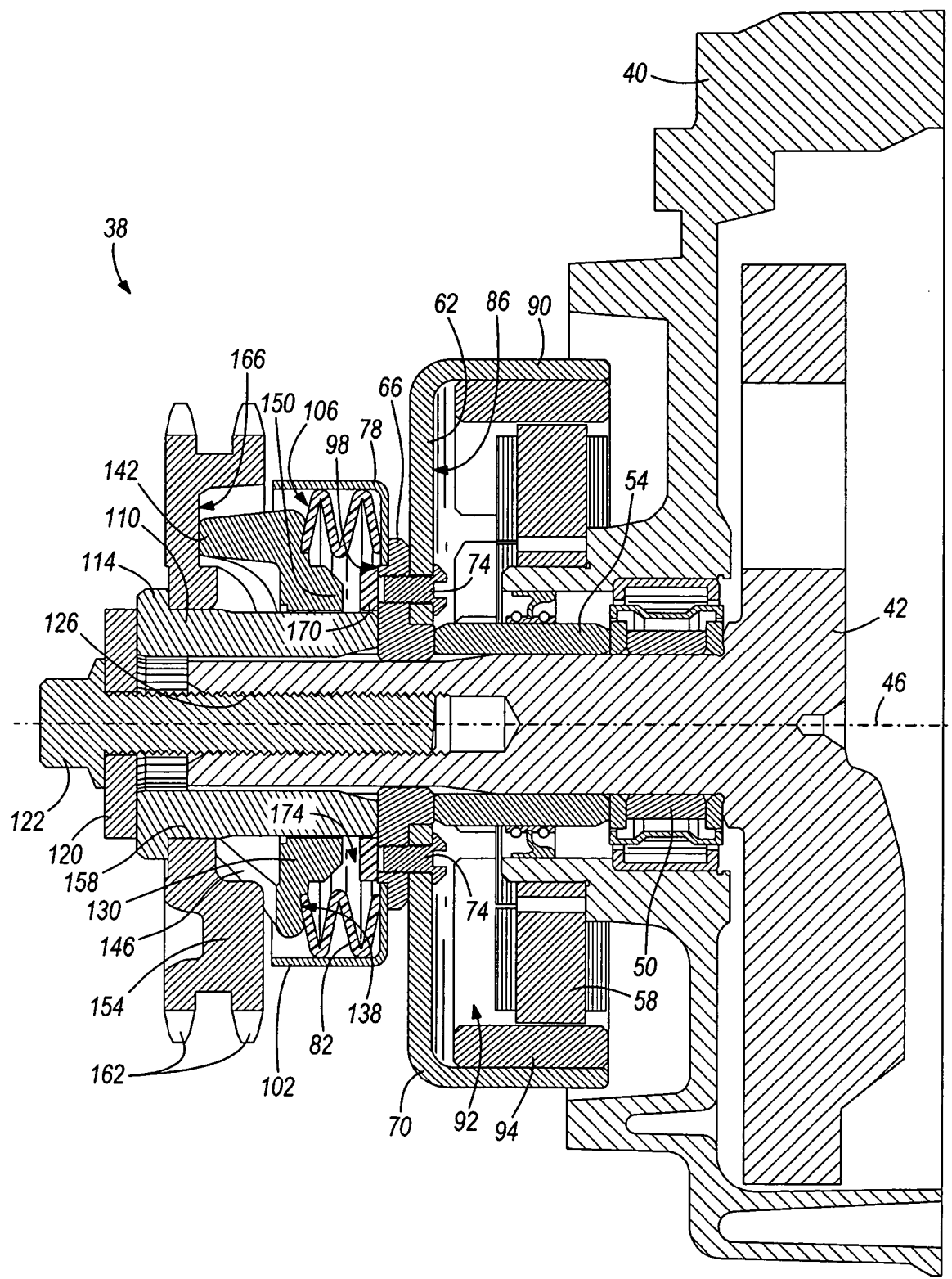
FIG. 3 is a section view taken along line 3—3 of FIG. 2.

FIGS. 2 and 3 illustrate a compensator assembly 38 that forms part of the engine assembly 14. The engine assembly 14 includes a crankcase 40 which supports a crankshaft 42 for rotation about a crankshaft axis 46. The end of the crankshaft 42 is externally splined and extends outwardly from the crankcase 40. The crankshaft 42 is supported for rotation by a bearing 50 that is pressed into the crankcase 40. A spacer 54 abuts the bearing 50 and properly spaces the compensator assembly 38 from the crankcase 40. The crankcase 40 also supports an alternator stator 58 positioned axially outwardly of the crankcase 40 and concentrically aligned with the crankshaft axis 46.

The compensator assembly 38 is coupled for rotation with the crankshaft 42 and operates to dampen impulse loads between the engine 14 and the rear wheel 34 during motorcycle operation. The compensator assembly 38 includes a hub in the form of a housing 62 that is coupled for rotation with the crankshaft 42. The housing 62 includes a carrier hub 66 having an internal spline that engages the external spline of the crankshaft 42. The illustrated carrier hub 66 is made of steel and includes a heat-treated spline area for increased durability. The housing 62 also includes a cup-shaped rotor shell 70 that is coupled to the carrier hub 66. The rotor shell 70 is coupled for rotation with the carrier hub 66 by providing a diametric interference fit between the rotor shell 70 and the carrier hub 66. Fasteners 74 also extend through the rotor shell 70 and into the carrier hub 66 to further couple the rotor shell 70 and carrier hub 66 to one another. The housing 62 also includes a cup-shaped spring housing 78 supported by the carrier hub 66. The spring housing 78 is biased into engagement with the carrier hub 66 by a biasing member in the form of a Belleville spring 82 as discussed further below.

The rotor shell 70 defines an annular first housing surface 86 that faces the crankcase 40. The rotor shell 70 also includes a generally cylindrical wall 90 that cooperates with the first housing surface 86 to define a first chamber 92 that opens toward the crankcase 40. An alternator rotor 94 is coupled to the cylindrical wall 90 and is positioned within the first chamber 92. The rotor 94 rotates around the stator 58 during engine operation to generate electrical power for the motorcycle electrical system. The spring housing 78 defines an annular second housing surface 98 that faces away from the crankcase 40. The spring housing 78 includes a generally cylindrical wall 102 that cooperates with the second housing surface 98 to define a second chamber 106 that opens away from the crankcase 40. The Belleville spring 82 engages the second housing surface 98 and is positioned within the second chamber 106. Although the illustrated housing 62 is a three-piece assembly it should be appreciated that the housing can be made of more or fewer pieces if desired, and can be fabricated using a number of different fabrication methods including, without limitation, casting, forging, welding, and the like.

The compensator assembly 38 also includes a collar member 110 coupled to the crankshaft 42 for rotation therewith. The collar member 110 is generally in the form of a hollow cylinder and has an internal spline that engages the external spline of the crankshaft 42. One end of the collar member 110 engages the carrier hub 66 and the other end defines an inwardly-facing flange or shoulder 114. The outer surface of the collar member 110 includes a cylindrical portion 116 and a splined portion 118. A washer 120 engages the flange end of the collar member 110 and a bolt 122 is extended through the washer 120 and into a threaded bore 126 formed in the end of the crankshaft 42. Tightening the bolt 122 applies clampload across the compensator assembly 38 through the washer 120, the collar member 110, the carrier hub 66, the spacer 54, and the bearing 50.

The compensator assembly 38 also includes a compensator 130 positioned at least partially within the second chamber 106. The compensator 130 defines an internally splined surface 134 that engages the splined portion 118 of the collar member 110. Engagement between the internally splined surface 134 and the splined portion 118 couples the compensator 130 for rotation with the collar member 110 (and for rotation with the crankshaft 42) while affording axial movement of the compensator 130 toward and away from the crankcase 40. The compensator 130 also defines an annular compensator surface 138 that faces the second housing surface 98, and a plurality (e.g. three, as illustrated) of axially extending cam lobes 142 extending axially away from the second housing surface 98. The cam lobes 142 cooperate to define a first cam surface 146 facing generally away from the crankcase 40. The compensator surface 138 engages the Belleville spring 82, which biases the compensator 130 away from the crankcase 40 as discussed further below. The compensator 130 also includes an annular projection 150 positioned radially inwardly of the compensator surface 138 and extending axially toward the second housing surface 98.

A sprocket 154 is positioned axially outwardly of the compensator 130 and includes a central bore 158 that receives the cylindrical outer portion 116 of the collar member 110. The cylindrical nature of the central bore 158 and the cylindrical outer portion 116 affords relative rotational movement between the sprocket 154 and the collar member 110. The sprocket 154 includes a plurality of sprocket teeth 162 that engage a chain (not shown) for transmission of drive torque between the crankshaft 40 and a transmission input shaft (not shown). The sprocket 154 defines a second cam surface 166 that faces the crankcase 40 and engages the first cam surface 146 of the compensator 130. As the bolt 122 is tightened during assembly, the shoulder 114 of the collar member 110 engages the sprocket 154 and draws the second cam surface 166 into engagement with the first cam surface 146, which in turn draws the compensator surface 138 into engagement with the Belleville spring 82. When the bolt 122 is fully tightened, the Belleville spring 82 is compressed between the compensator surface 138 and the second housing surface 98 such that the Belleville spring 82 biases the first and second cam surfaces 146, 166 into engagement with one another. During engine operation, engine torque is transmitted from the crankshaft 40 to the collar member 110 through the crankshaft spline, from the collar member 110 to the compensator 130 through the collar member splined portion 118, and from the compensator 130 to the sprocket 154 through engagement between the first and second cam surfaces 146, 166, which are biased together by the Belleville spring 82.

The compensator assembly 38 also includes a resilient member 170 positioned within the second chamber 106 between the second housing surface 98 and the compensator surface 138, and within an annular space 174 defined between the crankshaft 40 and the Belleville spring 82. The resilient member can be coupled to the second housing surface 98 (as illustrated), or to the compensator 130, or the resilient member 170 can be free to move axially in the space between the second housing surface 98 and the annular projection 150 of the compensator 130. The resilient member 170 resiliently limits axial movement of the compensator 130 towards the second housing surface 98 as discussed further below.

During engine operation, torque impulses or spikes are transmitted to the crankshaft 40 as a result of, among other things, individual combustion events in the engine combustion chambers. The compensator assembly 38 functions to dampen or reduce transmission of the torque spikes to the engine transmission, thereby reducing wear on the transmission and other driveline components and also improving the overall ride quality of the motorcycle. As discussed above, engine torque is transmitted from the crankshaft 40 to the sprocket 154 through engagement between the first and second cam surfaces 146, 166. When there is a sufficiently large torque impulse imparted to the crankshaft 40, the first and second cam surfaces 146, 166 slide with respect to one another, thereby urging the compensator 130 toward the second housing surface 98 against the biasing force of the Belleville spring 82. Relative movement between the first and second cam surfaces 146, 166 also allows the sprocket 154 to rotate slightly with respect to the crankshaft 40, which reduces transmission of the torque impulse from the crankshaft 40 to the chain and transmission. When the torque impulse dissipates (e.g. after the combustion event), the Belleville spring 82 urges the compensator 130 away from the second housing surface 98, thereby re-aligning the first and second cam surfaces 146, 166 which allows the sprocket 154 to rotate back into alignment with the crankshaft 40. In this regard the sprocket 154 rotationally "catches up" with the crankshaft 40 after the torque impulse has dissipated.

Different operating events create torque spikes of varying magnitudes. If a torque spike is sufficiently large (e.g. upon engine start-up), the compensator 130 may move a sufficient axial distance to engage the resilient member 170 such that the resilient member 170 is compressed between the annular projection 150 of the compensator 150 and the second housing surface 98. The resilient member 170, the annular projection 150, and the Belleville spring 82 are configured such that the annular projection 150 and the second housing surface 98 engage the resilient member 170 prior to bottoming out of the Belleville spring 82. The resilient member 170 also prevents direct contact between the compensator 130 and the housing 62. By preventing bottoming of the Belleville spring 82 and also preventing direct contact between the compensator 130 and the housing 62, the resilient member 170 substantially reduces or eliminates the audible "clunk" that would otherwise be associated with abrupt metallic contact between these components.

Various features and advantages of the invention are set forth in the following claims.

What is claimed is:

1. An internal combustion engine comprising:
a crankcase assembly;
a crankshaft rotatably supported for rotation about a crankshaft axis by the crankcase assembly;
a hub coupled to the crankshaft for rotation about the crankshaft axis;
a compensator coupled for rotation with the crankshaft about the crankshaft axis and axially moveable along the crankshaft axis;
a sprocket supported for rotation about the crankshaft axis and rotatable with respect to the crankshaft;
a biasing member applying a biasing force biasing the compensator into engagement with the sprocket; and
a resilient member positioned between the hub and the compensator, wherein in response to relative rotation between the compensator and the sprocket the compensator moves axially against the biasing force of the biasing member, and wherein sufficient axial movement of the compensator engages the resilient member with the hub and with the compensator to thereby resiliently limit further axial movement of the compensator.

2. The internal combustion engine of claim 1, wherein the compensator defines a first cam surface and the sprocket defines a second cam surface, the first cam surface biased into engagement with the second cam surface by the biasing member, and wherein engine torque is transmitted from the crankshaft to the sprocket by way of engagement between the first and second cam surfaces.

3. The internal combustion engine of claim 2, wherein in response to relative rotation between the compensator and the sprocket the first and second cam surfaces cooperate to move the compensator axially against the biasing force of the biasing member.

4. The internal combustion engine of claim 1, wherein the biasing member includes an annular spring positioned between the hub and the compensator, and wherein the resilient member is positioned in an annular space defined between the crankshaft and the spring.

5. The internal combustion engine of claim 1, wherein the resilient member resiliently limits axial movement of the compensator to prevent bottoming out of the biasing member.

6. The internal combustion engine of claim 1, wherein the compensator moves axially toward the crankcase assembly in response to relative rotation between the compensator and the sprocket.

7. The internal combustion engine of claim 1, further comprising an alternator assembly, and wherein the hub supports a rotor portion of the alternator assembly.

8. A motorcycle comprising:
a frame;
a steering assembly pivotally coupled to the frame;
a front wheel rotatably coupled to the steering assembly and supporting a forward portion of the motorcycle;
a rear wheel coupled to the frame and supporting a rearward portion of the motorcycle;
an engine assembly coupled to the frame, the engine assembly including:
a crankcase assembly;
a crankshaft rotatably supported for rotation about a crankshaft axis by the crankcase assembly;
a hub coupled to the crankshaft for rotation about the crankshaft axis;
a compensator coupled for rotation with the crankshaft about the crankshaft axis and axially moveable along the crankshaft axis;
a sprocket supported for rotation about the crankshaft axis and rotatable with respect to the crankshaft;
a biasing member applying a biasing force biasing the compensator into engagement with the sprocket; and
a resilient member positioned between the hub and the compensator, wherein in response to relative rotation between the compensator and the sprocket the compensator moves axially against the biasing force of the biasing member, and wherein sufficient axial movement of the compensator engages the resilient member with the hub and with the compensator to thereby resiliently limit further axial movement of the compensator.

9. The motorcycle of claim 8, wherein the compensator defines a first cam surface and the sprocket defines a second cam surface, the first cam surface biased into engagement with the second cam surface by the biasing member, and wherein engine torque is transmitted from the crankshaft to the sprocket by way of engagement between the first and second cam surfaces.

10. The motorcycle of claim 9, wherein in response to relative rotation between the compensator and the sprocket the first and second cam surfaces cooperate to move the compensator axially against the biasing force of the biasing member.

11. The motorcycle of claim 8, wherein the biasing member includes an annular spring positioned between the hub and the compensator, and wherein the resilient member is positioned in an annular space defined between the crankshaft and the spring.

12. The motorcycle of claim 8, wherein the resilient member resiliently limits axial movement of the compensator to prevent bottoming out of the biasing member.

13. The motorcycle of claim 8, wherein the compensator moves axially toward the crankcase assembly in response to relative rotation between the compensator and the sprocket.

14. The motorcycle of claim 8, further comprising an alternator assembly, and wherein the hub supports a rotor portion of the alternator assembly.

15. An internal combustion engine comprising:
a crankcase assembly;
a crankshaft rotatably supported for rotation about a crankshaft axis by the crankcase assembly;
a hub coupled to the crankshaft for rotation about the crankshaft axis, the hub defining a first surface facing toward the crankcase assembly, and a second surface facing away from the crankcase assembly;
a compensator defining a compensator surface facing the second surface and a first cam surface facing away from the crankcase assembly, the compensator coupled for rotation with the crankshaft about the crankshaft axis and axially moveable along the crankshaft axis;
a sprocket supported for rotation about the crankshaft axis and rotatable with respect to the crankshaft, the sprocket defining a second cam surface facing the crankcase assembly; and a biasing member applying a biasing force biasing the compensator away from the crankcase assembly and biasing the first cam surface into engagement with the second cam surface, wherein in response to relative rotation between the compensator and the sprocket the compensator moves axially toward the crankcase assembly against the biasing force of the biasing member.

16. The internal combustion engine of claim 15, wherein engine torque is transmitted from the crankshaft to the sprocket by way of engagement between the first and second cam surfaces.

17. The internal combustion engine of claim 15, wherein the hub defines a first chamber opening toward the crankcase assembly and at least partially defined by the first surface, and a second chamber opening away from the crankcase assembly and at least partially defined by the second surface, and wherein the compensator is at least partially received by the second chamber.

18. The internal combustion engine of claim 17 further comprising an alternator assembly, and wherein the first chamber receives a rotor portion of the alternator assembly.

19. The internal combustion engine of claim 15, wherein the biasing member includes a Belleville spring positioned in the second chamber between the second surface and the compensator surface.

20. The internal combustion engine of claim 15, further comprising a resilient member positioned between the compensator and the hub and spaced from at least one of the compensator and the hub, and wherein sufficient axial movement of the compensator toward the crankcase assembly engages the resilient member with the hub and with the compensator to thereby resiliently limit further axial movement of the compensator toward the crankcase assembly.

21. A motorcycle comprising:
a frame;
a steering assembly pivotally coupled to the frame;
a front wheel rotatably coupled to the steering assembly and supporting a forward portion of the motorcycle;
a rear wheel coupled to the frame and supporting a rearward portion of the motorcycle;
an engine assembly coupled to the frame, the engine assembly including:
a crankcase assembly;
a crankshaft rotatably supported for rotation about a crankshaft axis by the crankcase assembly;
a hub supported by and coupled to the crankshaft for rotation about the crankshaft axis, the hub defining a first surface facing toward the crankcase assembly, and a second surface facing away from the crankcase assembly;
a compensator defining a compensator surface facing the second surface and a first cam surface facing away from the crankcase assembly, the compensator coupled for rotation with the crankshaft about the crankshaft axis and axially moveable along the crankshaft axis;
a sprocket supported for rotation about the crankshaft axis and rotatable with respect to the crankshaft, the sprocket defining a second cam surface facing the crankcase assembly; and
a biasing member applying a biasing force biasing the compensator away from the crankcase assembly and biasing the first cam surface into engagement with the second cam surface, wherein in response to relative rotation between the compensator and the sprocket the compensator moves axially toward the crankcase assembly against the biasing force of the biasing member.

22. The motorcycle of claim 21, wherein engine torque is transmitted from the crankshaft to the sprocket by way of engagement between the first and second cam surfaces.

23. The motorcycle of claim 21, wherein the hub defines a first chamber opening toward the crankcase assembly and at least partially defined by the first surface, and a second chamber opening away from the crankcase assembly and at least partially defined by the second surface, and wherein the compensator is at least partially received by the second chamber.

24. The motorcycle of claim 23 wherein the engine assembly includes an alternator assembly, and wherein the first chamber receives a rotor portion of the alternator assembly.

25. The motorcycle of claim 21, wherein the biasing member includes a Belleville spring positioned in the second chamber between the second surface and the compensator surface.

26. The motorcycle of claim 21, wherein the engine assembly includes a resilient member positioned between the compensator and the hub and spaced from at least one of the compensator and the hub, and wherein sufficient axial movement of the compensator toward the crankcase assembly engages the resilient member with the hub and with the compensator to thereby resiliently limit further axial movement of the compensator toward the crankcase assembly.

* * * * *